BANDWIDTH SWITCHING CIRCUIT
Filed April 5, 1963
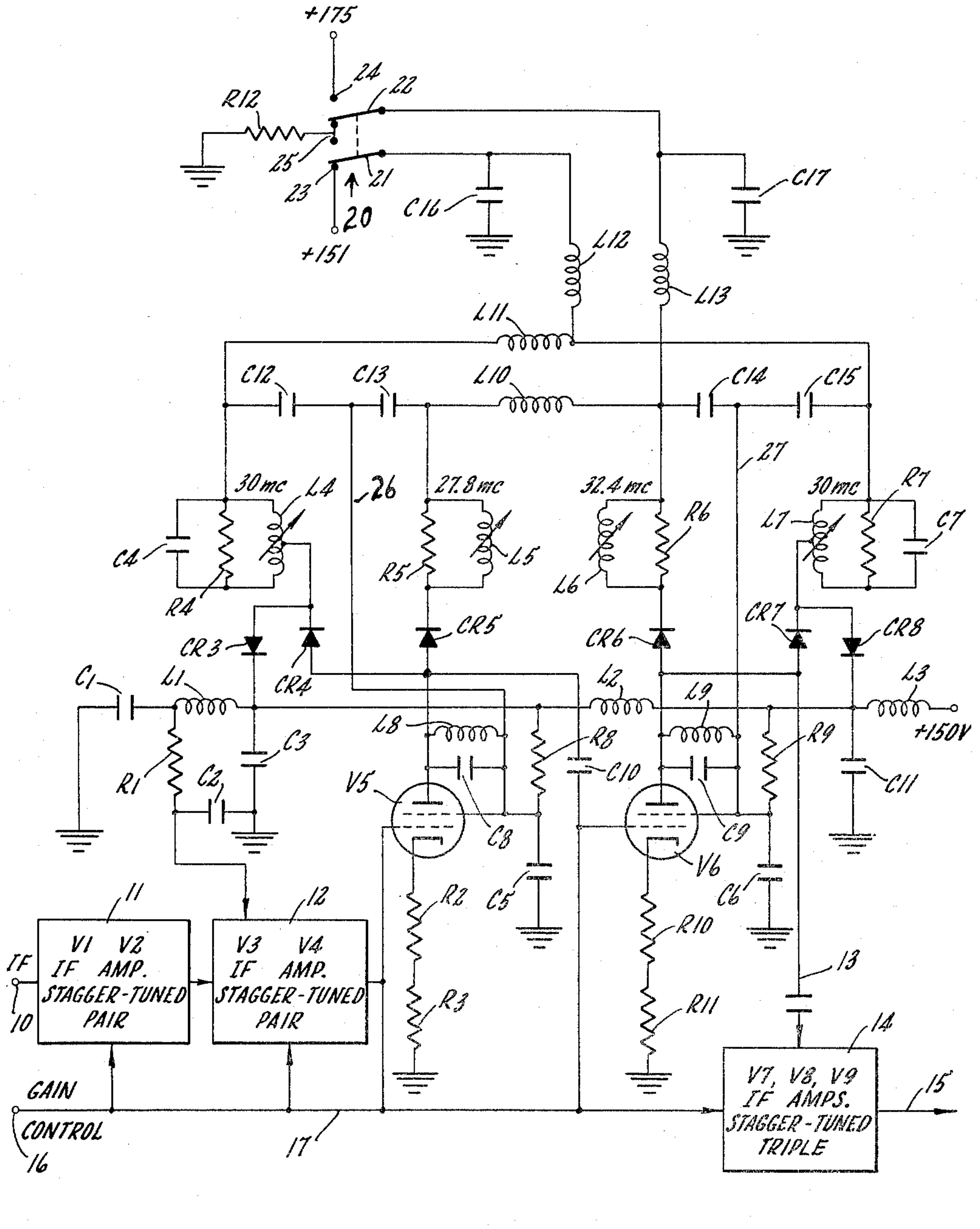
INVENTORS
Kenneth M. Ray
Rolf W. Bohnsack
By H. H. Locke
Att'ys.

3,222,612
BANDWIDTH SWITCHING CIRCUIT

Kenneth M. Ray, New Hyde Park, and Rolf W. Bohnsack, North Babylon, N.Y., assignors, by mesne assignments, to the United States of America as represented by the Secretary of the Navy Filed Apr. 5, 1963, Ser. No. 271,035
10 Claims. (Cl. 330—126)

This invention relates to bandwidth switching circuits and more particularly to a means of diode switching the bandwidth of an amplifier selectively between wide band and narrow band tuned circuits, as in wide band and narrow band intermediate frequency amplifiers, and the like.

The intermediate frequency (IF) amplifier of a receiver for receiving radio frequency signals receives the IF signals and provides a sufficiently amplified output signal to insure proper operation of the subsequent second detector unit. In radar receivers for determining range of target objects it is an advantage to use wide band IF amplification under some conditions and narrow band IF amplification under other conditions. Mechanical switching for these IF amplifier circuits is too slow and unreliable and electronic switching using electronic tubes becomes too burdensome in space and weight for aircraft radar systems.

In the present invention, the means of switching the width of the IF band is accomplished by crystal diodes in branch anode load circuits of the amplifier tubes. These diodes are selectively forward biased and back biased to cause the amplifier tubes to be placed in circuit with wide band tuned loads or narrow band tuned loads. Biasing of the diodes is provided by switching two voltages to the diodes, which switching could be automatically controlled by the radar. In this latter manner the IF amplifier could be operated to have a wide band response for short-pulse transmitter operation and a narrow band response for long-pulse transmitter operation. This feature permits accurate tracking and target discrimination when in short-pulse transmitter operation and improved signal-to-noise ratio for weak target signals when tracking in long-pulse transmitter operation. It is therefore a general object of this invention to provide an electrical frequency band switching circuit for switching an amplifier selectively between wide band and narrow band tuned frequency loads.

These and other objects and the attendant advantages, features, and uses will become more apparent to those skilled in the art as the description proceeds and considered along with the accompanying drawing of a single figure illustrating a partially block and partially schematic circuit diagram of the bandwith switching circuit.

Referring more particularly to the drawing, there is illustrated an IF string including three IF amplifier stagger-tuned pairs of tube circuits and one IF stagger-tuned triple tube circuit. The first IF amplifier stagger-tuned pair is illustrated by block 11 which includes vacuum tubes V1 and V2, the second IF stagger-tuned pair is illustrated by block 12 and includes tubes V3 and V4, and the IF amplifier stagger-tuned triple is illustrated by block 14 and includes tubes V7, V8, and V9. The IF signal is applied at terminal 10 to the grid of the first tube V1 in the stagger-tuned pair 11 and the output is taken from the anode of V4 in the stagger-tuned pair 12 and applied to the control grid of tube V5 in the third stagger-tuned pair shown in circuit schematic. The output of tube V5 is taken from the anode thereof which is capacitor coupled through the capacitor C10 to the control grid of tube V6, and the output of the latter tube is capacitor coupled to the grid of V7 of the stagger-tuned triple 14 and the output taken from the anode of tube V9 in this stagger-tuned triple, as is well understood by those skilled in the IF amplifier art. The gain control voltage is applied at terminal 16 to the grids of all the stagger-tuned pairs and triple through the conductor means 17 which control voltage coupling is also well understood by those skilled in the art. Anode voltage is applied by by a conductor or bus including the inductors L1, L2, and L3 from a positive voltage source, herein illustrated for the purpose of example as being 150 volts. The bus between each of the inductors is capacitor coupled to ground through the capacitors C1, C3, and C11. The anode of each of tubes V5 and V6 is coupled from this anode voltage bus through a voltage dropping means, this being resistor R8 and the parallel coupling of inductor L8 and capacitor C8 to the anode of tube V5 and through resistor R9 and the parallel coupling of inductor L9 and capacitor C9 to the anode of tube V6. The resistors R8 and R9 are of a value to produce an IR drop of approximately 25 volts to the respective tube anodes, this voltage also being applied to the screen grids of tubes V5 and V6. The screen grids of tubes V5 and V6 are also capacitor coupled to ground through the capacitors C5 and C6, respectively, and the cathodes of these tubes are biased from ground potential through the resistors R2, R3 and R10, R11, respectively. While V5 and V6 may be pentodes with suppressor grids coupled to the cathodes, the suppressor grids are not shown or described herein for simplicity of description. Other stagger-tuned pairs are likewise coupled as illustrated by R1 and C2 from the anode voltage bus.

The anodes of the stagger-tuned pair of IF amplifier tubes V5 and V6 are coupled to be switched for a wide band and a narrow band of intermediate frequencies. This is accomplished by coupling the anode of tube V5 through one branch circuit including a crystal diode CR5, a parallel tuned circuit consisting of a resistor R5 and an inductor L5, and serially through inductor L10 and inductor L13 to one switch blade 22 of a double-throw double-pole switch 20. For the purpose of example in describing the function and operation of this device, let it be asumed that the tuned circuit R5, L5 is tuned for a low intermediate frequency of 27.8 megacycles (mc.). In like manner, the anode of tube V6 is coupled through one branch circuit including a crystal diode CR6, a tuned parallel circuit consisting of an inductor L6 and a resistor R6, and through an inductor L13 to the switch blade 22 of switch 20. For the purpose of example the tuned circuit L6, R6 is tuned for a high intermediate frequency of 32.4 mc. The crystal diodes CR5 and CR6 are each oriented such that the anode thereof is coupled to the anode of the respective tubes V5 and V6 and the cathodes thereof are coupled, respectively, to the tuned circuits R5, L5 and R6, L6. The anode of tube V5 is likewise coupled through a second branch circuit including a crystal diode CR4 and the tuned circuit including capacitor C4, resistor R4, and inductor L4 and serially through inductors L11 and L12 to the switch blade 21 of switch 20. In a similar manner the anode of tube V6 is coupled through a second branch circuit including a crystal diode CR7, the tuned circuit L7, R7, C7 and the inductor L12 to the switch blade 21 of switch 20. The crystal diodes CR4 and CR7 are each oriented with the anode thereof coupled, respectively, to the anode of tubes V5 and V6. The cathode of crystal diode CR4 is coupled to the anode of a crystal diode CR3, the cathode of the latter being coupled to the anode voltage bus between inductors L1 and L2. In like manner the cathode of the crystal diode CR7 is coupled to the anode of a crystal diode CR8, the cathode of the latter being coupled to the anode voltage bus between the inductors L2 and L3. The tuned circuits C4, R4, L4 and L7, R7, C7 are each shown as being tuned to a middle intermediate frequency of 30 mc. for the purpose of illustration herein. The screen grid of tube V5 is coupled by way of conductor 26 to one plate of each of two capacitors C12 and C13, the opposite plate of capacitor C12 being coupled to the second branch circuit of tube V5 at the juncture point between the tuned circuit C4, R4, L4 and the inductor L11, while the opposite plate of the capacitor C13 is coupled to the first branch circuit of tube V5 at the juncture of the tuned circuit R5, L5 and the inductor L10. In like manner the screen grid of tube V6 is coupled by a conductor 27 to one plate of each of two capacitors C14 and C15, the other plate of capacitor C14 being coupled to the juncture of the tuned circuit L6, R6 and L13 in the first branch circuit of tube V6, while the opposite plate of capacitor C15 is coupled to the juncture of the inductor L12 and the tuned circuit L7, R7, C7 in the second branch circuit of tube V6. The switch blades 21 and 22 are each capacitor coupled to ground through the capacitors C16 and C17, respectively. The lower contact 23 of switch 20 is coupled to a voltage source, illustrated herein for the purpose of example as being 151 volts, and the contact 24 of switch 20 is coupled to a voltage source, herein illustrated for the purpose of example as being 175 volts. The center contact 25 of switch 20 is coupled through a current limiting resistor R12 to ground potential. The switch 20 is arranged to have the switch blade 22 alternately seated between the contacts 24 and 25 and the switch blade 21 alternately seated between the contacts 23 and 25. While other voltages could be applied to the contacts of switch 20 and other bands of intermediate frequencies could be built into the tuned circuits, the voltages and frequency bands shown herein, for the purpose of example, are useful in providing one description of operation in explaining the functions and results of this invention and are not to be considered in any way as limiting the invention to the values in the examples.

*Operation*

In the operation of this device, let it be asumed that switch 20 is positioned with blades 21 and 22 on the lower contacts, as shown, which provides zero voltage to the switch blade 22. This zero voltage is applied through the inductor L13 and the tuned circuit R6, L6 to the cathode of crystal diode CR6 which will forward bias diode CR6 by virtue of approximately 125 volts being on the anodes of tube V6 and crystal diode CR6. In like manner, this zero voltage is conducted by way of inductor L10 and the tuned circuit R5, L5 to the cathode of crystal diode CR5 which provides forward bias of this crystal diode by virtue of the 125 volt anode voltage at tube V5 and CR5. At the same time, 151 volts is applied to the switch blade 21 which voltage is conducted by way of the inductors L11 and L12 through the respective 30 mc. tuned circuits to the cathodes of CR4 and CR7 and the anodes of CR3 and CR8. Since the anodes of CR4 and CR7 are at 125 volts, each of these crystal diodes will be back biased and, consequently, interrupt the second branch circuit of each tube V5 and V6. The crystal diodes CR3 and CR8, being oriented in the opposite direction from diodes CR4 and CR7, are forward biased to thereby provide a substantially alternating current short circuit for the respective 30 mc. tuned circuits thus minimizing interaction with the circuits of inductors L5 and L6. The tuned circuits R5, L5, tuned for 27.8 mc., and L6, R6, tuned for 32.4 mc., being in closed circuit through the respective crystal diodes CR5 and CR6, cause the third stagger-tuned pair V5, V6 to operate over the broadband IF from 27.8 mc. to 32.4 mc. The output from tube V6 through the capacitor coupling of conductor 13 to the IF amplifier stagger-tuned triple 14 produces broadband IF on the output 15 which is amplified sufficiently to properly operate the second detector, or like circuit, not shown herein. The above described operation constitutes the switched position of the wide band of broadband of IF for the second detector.

When switch 20 is thrown to its upper position, in which case switch blade 22 has 175 volts applied thereto each of the crystal diodes CR5 and CR6 will be back biased and thus break the anode circuit of tubes V5 and V6 to their respective tuned circuits of 27.8 mc. and 32.4 mc., respectively. At the same time, switch blade 21 will now be grounded at the contact 25 to place zero potential on the cathodes of crystal diodes CR4 and CR7 and on the anodes of crystal diodes CR3 and CR8. This applied voltage forward biases crystal diodes CR4 and CR7 and places crystal diodes CR3 and CR8 in a back biased condition thereby establishing a closed circuit through each of the second branch circuits of tubes V5 and V6 to place the tuned circuits C4, R4, L4 and L7, R7, C7 in the anode circuits of tubes V5 and V6, respectively. With the switch 20 in its upper position the third IF amplifier stagger-tuned tubes V5 and V6 will operate only in its narrow band middle IF of 30 mc. which is conducted to the IF amplifier stagger-tuned triple 14 and thus over the output 15 to the second detector. The screen grid coupling through the conductors 26 and 27 and the tuned couplings of L8, C8 and L9, C9 to the anodes of tubes V5 and V6 complete the tuned IF circuitry as is well understood by those skilled in the art. As may now be readily understood, switch 20 controls the switching of diodes CR3 through CR8 to cause the third IF amplifier stagger-tuned pair to operate in either of the wide band or narrow band of intermediate frequencies.

In the actual practice of the invention where the invention is used in a radar receiver, or the like, it may be expedient to automatically control the switch 20 for certain radar transmitter operation such that the IF amplifier will have a wide band response for short-pulse transmitter operation and narrow band response for long-pulse transmitter operation. This may be accomplished by utilizing a relay switch for switch 20 under the control of a gating generator or a sensitivity time control circuit to switch the IF amplifier in an alternate manner from wide band to narrow band operation in accordance with radar transmitted pulses. While this operation of switch 20 is readily within the skill of the radar artisan to be automatically controlled by the radar system, it is not considered necessary in describing the functions and results of this invention and, accordingly, no such automatic coupling is shown or described.

While many modifications and changes may be made in the constructional details or circuit arrangement, or while the various voltages and tuned circuits may be rearranged to suit particular applications without departing from the spirit and scope of this invention, applicant desires to be limited only by the scope of the appended claims.

We claim:

1. A bandwidth switching circuit comprising:
a pair of electron emission means, each having two conduction electrodes and at least one control electrode;
first and second branch circuits coupled in common to one conduction electrode of each electron emission means;
a diode in each first and second branch circuit;
a low, a high, and two intermediate tuned networks, said low and high tuned networks being coupled each in said first branch circuit of each electron emission means and said two intermediate tuned networks each being coupled in said second branch circuit of each electron emission means; and
means for applying potentials to said diodes in pairs to provide conduction through said electron emission means and said low and high tuned networks and to block conduction through said two intermediate tuned networks in one condition, and to provide conduction through said electron emission means and said two intermediate tuned networks and to block conduction through said low and high tuned networks in another condition whereby the wide and narrow frequency bands are selectable.

2. A bandwidth switching amplifier circuit comprising:
an input for conducting an input signal in a predetermined frequency range;
a pair of electron emission means, each having two conduction electrodes and at least one control electrode, said control electrodes being coupled in common to said input;
first and second branch circuits coupled to one conduction electrode of each electron emission means;
a low tuned load coupled in the first branch circuit of one electron emission means, a high tuned load coupled to the first branch circuit of the other electron emission means, and an intermediate tuned load coupled in each second branch circuit;
a diode in each branch circuit coupling between said electron emission means and the respective tuned load;
two voltages switchable to said first and second branch circuits to alternately bias said diodes to place said low and high tuned loads in circuit and said intermediate tuned loads in circuit; and
an output from said one conduction electrode of said electron emission means whereby input signals will be amplified in the selected wide band and said narrow band over said output.

3. A bandwidth switching amplifier circuit as set forth in claim 2 wherein
said low tuned and high tuned loads are frequency resonant within said predetermined frequency range which is an intermediate frequency range.

4. A bandwidth switching amplifier circuit as set forth in claim 3 wherein
said two voltages comprise ground potential and a potential sufficient to overcome the back bias of said diodes.

5. A bandwidth switching amplifier circuit as set forth in claim 4 wherein
said diodes are oriented with the cathodes thereof coupled to the respective tuned load circuit.

6. A bandwidth switching amplifier circuit as set forth in claim 5 wherein
said pair of electron emission means are vacuum tubes each having at least an anode and a cathode constituting said conduction electrodes and each having a control grid with the anodes thereof coupled to said branch circuits and with said anodes and cathodes thereof coupled across a voltage biasing source, and the control grids thereof are said control electrodes.

7. An intermediate frequency amplifier having a plurality of stagger-tuned pairs of vacuum tubes, one of said stagger-tuned pairs of vacuum tubes having a bandwidth switching means comprising:
first and second branch circuits coupled to the anode of each tube;
a low intermediate frequency tuned load coupled in said first branch circuit of one tube and a high intermediate frequency tuned load coupled in said first branch circuit of the other tube of said pair constituting said stagger-tuning of intermediate frequency, and a middle intermediate frequency tuned load coupled in each said second branch circuit;
a diode in each first and second branch circuit between the tube anode and the respective tuned load, each diode being oriented with the anode thereof coupled in common with said tube anode;

a voltage bias across each said vacuum tube;
means for switching two voltages at alternate times to said first and second branch circuits to forward bias said diodes in said first branch circuit while back biasing said diodes in said second branch circuit, and vice versa; and
an input applied to the control grids of said tubes for applying a wide band of intermediate frequency signals, and an output taken from the tube anodes whereby wide band and narrow band intermediate frequency signals are selected and amplified.

8. An intermediate frequency amplifier as set forth in claim 7 wherein
said two voltages in said means for switching two voltages comprises ground potential and a potential exceeding the anode voltage of said pair of stagger-tuned vacuum tubes.

9. An intermediate frequency amplifier as set forth in claim 8 wherein
said first and second branch circuits each includes an inductance between the respective tuned load and said means for switching two voltages.

10. An intermediate frequency amplifier having a plurality of stagger-tuned pairs of vacuum tubes, one of said stagger-tuned pairs of vacuum tubes having a bandwidth switching means comprising:
first and second branch circuits coupled to the anode of each tube;
a low intermediate frequency tuned load coupled in said first branch circuit of one tube and a high intermediate frequency tuned load coupled in said first branch circuit of the other tube of said pair constituting said stagger-tuning within said intermediate frequency, and a middle intermediate frequency tuned load coupled in each said second branch circuit;
an anode voltage applied to the anodes of said tubes;
a first and second diode in each first and second branch circuit respectively between the tube anode and the respective tuned load, each diode being oriented with the anode thereof coupled in common with said tube anode;
a third diode coupling each second branch circuit between said second diode and middle intermediate frequency tuned load to said anode voltage, each said third diode being oriented with its anode coupled to the cathode of said second diode;
means for switching a zero potential and a potential greater than said anode voltage at alternate times to said first and second branch circuits to cause forward bias of said first and third diodes while back biasing said second diodes, and vice versa; and
an intermediate frequency input applied to the control grids of said pair of vacuum tubes for applying wide band intermediate frequency signals, and an output taken from the tube anodes whereby said intermediate frequency amplifier is switchable to operate as a wide band and a narrow band device.

References Cited by the Examiner

UNITED STATES PATENTS

| | | | |
|---|---|---|---|
| 2,464,125 | 3/1949 | Fisher et al. | 330—145 |
| 2,498,561 | 2/1950 | Lipkin | 330—154 X |
| 2,900,457 | 8/1959 | Stull | 330—126 |
| 2,933,694 | 4/1960 | Carter | 330—155 |
| 3,183,373 | 5/1965 | Sakurai | 307—88.5 X |
| 3,200,345 | 8/1965 | Luckenbach et al. | 330—29 |

ROY LAKE, *Primary Examiner.*